United States Patent
Tian

(10) Patent No.: US 11,787,538 B2
(45) Date of Patent: Oct. 17, 2023

(54) AMPHIBIOUS DRONE WITH DETACHABLE BUOYS

(71) Applicant: Shanghai Autoflight Co., Ltd., Shanghai (CN)

(72) Inventor: Yu Tian, Hong Kong (CN)

(73) Assignee: SHANGHAI AUTOFLIGHT CO., LTD., Shanghai (CN)

(*) Notice: Subject to any disclaimer, the term of this patent is extended or adjusted under 35 U.S.C. 154(b) by 268 days.

(21) Appl. No.: 17/067,770

(22) Filed: Oct. 12, 2020

(65) Prior Publication Data
US 2022/0111958 A1 Apr. 14, 2022

(51) Int. Cl.
| | |
|---|---|
| *B64C 25/54* | (2006.01) |
| *B64C 35/00* | (2006.01) |
| *B64C 39/02* | (2023.01) |
| *B64U 10/25* | (2023.01) |
| *B64U 30/10* | (2023.01) |
| *B64U 30/20* | (2023.01) |
| *B64U 50/13* | (2023.01) |

(Continued)

(52) U.S. Cl.
CPC .......... *B64C 35/008* (2013.01); *B64C 39/024* (2013.01); *B64U 10/25* (2023.01); *B64U 30/10* (2023.01); *B64U 30/20* (2023.01); *B64U 50/13* (2023.01); *B64U 60/10* (2023.01); *B64U 70/60* (2023.01)

(58) Field of Classification Search
CPC ......... B64C 25/54; B64C 25/56; B64C 25/66; B64C 35/00; B64C 35/001; B64C 35/002; B64C 35/003; B64C 35/005; B64C 35/008; B60F 5/02
See application file for complete search history.

(56) References Cited

U.S. PATENT DOCUMENTS

| | | | |
|---|---|---|---|
| 8,453,962 B2 * | 6/2013 | Shaw | B64C 27/52 244/17.23 |
| 2008/0302908 A1 * | 12/2008 | Filipek | B63B 39/061 244/105 |

(Continued)

FOREIGN PATENT DOCUMENTS

| | | | | |
|---|---|---|---|---|
| CA | 2547991 A1 * | 3/2005 | ............. | B64C 25/40 |
| CN | 110481777 A * | 11/2019 | | |

(Continued)

*Primary Examiner* — Christopher D Hutchens
*Assistant Examiner* — Michael A. Fabula
(74) *Attorney, Agent, or Firm* — WPAT LAW, P.C.; Anthony King

(57) ABSTRACT

An amphibious drone having a fuselage, a linear support, a wing and a take-off and landing device. The take-off and landing device is on the lower surface of the linear support or the wing. The take-off and landing device has a buoyancy unit and a power device, and the power device is capable of generating thrust to push the buoyancy unit to move. The take-off and landing device can be on the lower surface of the drone, and realizes the water support of the drone by symmetrically providing the take-off and landing device. At the same time, the take-off and landing device is further provided with a power device for pushing the drone to be started. The amphibious drone can take off and land by relying on the take-off and landing device, which can be disassembled to adapt to different usage conditions.

4 Claims, 5 Drawing Sheets

(51) Int. Cl.
 *B64U 70/60* (2023.01)
 *B64U 60/10* (2023.01)

(56) References Cited

U.S. PATENT DOCUMENTS

| | | | | |
|---|---|---|---|---|
| 2009/0008499 | A1* | 1/2009 | Shaw | B64C 27/08 244/17.23 |
| 2010/0032522 | A1* | 2/2010 | Zadini | B63H 25/46 244/105 |
| 2016/0167470 | A1* | 6/2016 | Seydoux | B63H 7/02 244/2 |
| 2021/0237834 | A1* | 8/2021 | They | B64F 1/12 |
| 2021/0394900 | A1* | 12/2021 | They | B60F 5/003 |

FOREIGN PATENT DOCUMENTS

| | | | | | |
|---|---|---|---|---|---|
| CN | 112572702 | A | * | 3/2021 | |
| KR | 20190090621 | A | * | 8/2019 | B64C 25/54 |
| WO | WO-2018047187 | A1 | * | 3/2018 | B64C 27/08 |

\* cited by examiner

AMPHIBIOUS DRONE WITH DETACHABLE BUOYS

TECHNICAL FIELD

The present invention relates to the field of designing and manufacturing drones, in particular to an amphibious drone.

BACKGROUND

At present, the domestic drone market has been developed for nearly 30 years. It has gradually expanded from the initial military field to the consumer field. The drone market has become increasingly popular. The recognition and demand for drones by ordinary people has gradually increased, and even has exponential growth. Furthermore, drones have low cost and high efficiency, no risk of casualties, strong survivability, good maneuverability, and convenient use. Therefore, drones are widely used in police, agriculture, geology, electricity, disaster relief, video shooting and other industries.

With the rapid development of related technologies of drones at home and abroad, the types of drone systems are also increasing. At present, water drones account for the vast majority of the market, and some floating drones have also appeared on the market. However, there is always an impassable horizontal groove between water drones and land drones, because almost all drones only have a single take-off and landing condition, and it is difficult to achieve the ability to take off and land on land and water at the same time. Some existing drones can only use the front or rear propellers of the fuselage as a power device to provide forward power during the taxiing takeoff or landing phase. When the propeller of the fuselage cannot be operated due to the condition limitation of the water area, the takeoff on the water surface cannot be realized and the takeoff ability is lost. Moreover, because a device that can float on the water surface, such as an air cushion, is usually installed below the fuselage of the water drone, the water drone cannot land and take off on land due to the limitation of the device.

SUMMARY

The technical problem to be solved by the present invention is to overcome the defect that the drone in the prior art cannot realize the take-off and landing on both water and land at the same time, and to provide an amphibious drone.

The present invention solves the above technical problems through the following technical solutions:

An amphibious drone, comprising a fuselage, a linear support and a wing, wherein the amphibious drone is equipped with a take-off and landing device, the take-off and landing device is provided on the lower surface of one or more of the fuselage, the linear support and the wing, the take-off and landing device comprises a buoyancy unit and a power device, and the power device is capable of generating thrust to push the buoyancy unit to move. The installation of the take-off and landing device can realize that the buoyancy unit serves as a buoyancy device to support the drone when the amphibious drone is floating on water. The take-off and landing device can also be used as a support device when the drone is landing on land. Since the take-off and landing device has its own power device, the power device can directly drive the drone to move and take off and land by driving the buoyancy unit to move.

Preferably, the take-off and landing device is detachably connected to the fuselage and/or the linear support and/or the wing. The detachable connection allows the drone to detach the take-off and landing device when it does not need to land on water, reducing the weight of the drone to achieve a lighter flight effect. The take-off and landing device is reinstalled before the flight that requires landing on water, and is convenient and practical.

Preferably, a bump is provided on the take-off and landing device, the lower surface of the fuselage and/or the linear support and/or the wing is provided with a receiving groove, and when the take-off and landing device and the fuselage and/or the linear support and/or the wing are in a connected state, the bump is provided in the receiving groove. The bump and the receiving groove are provided so that the take-off and landing device and the fuselage and/or the linear support and/or the wing are connected quickly and sufficiently, and can realize the quick disassembly and assembly between the take-off and landing device and the drone.

Preferably, the buoyancy unit is an open hollow structure, and at least a part of the power device is located in the intermediate space of the buoyancy unit. A part of the power device is installed in the intermediate space of the buoyancy unit to realize that when the power device is started, an air or water flow is formed in the open hollow space of the buoyancy unit. The thrust generated by the air or water flow pushes the power device to move forward and then drives the amphibious drone to move forward.

Preferably, the power device comprises a thruster, and the thruster is provided in the intermediate space of the buoyancy unit.

Preferably, the thruster is a propeller system.

Preferably, the power device further comprises a power connector, the power connector is located at the connection position between the take-off and landing device and the fuselage and/or the linear support and/or the wing, the thruster and the power connector are connected by a power line, a power connector is further provided at the connection position between the fuselage and/or the linear support and/or the wing and the take-off and landing device, and the power device and the fuselage and/or the linear support and/or the wing are electrically connected through the connection state of the power connector. The power connector is provided to supply power to the thruster through the drone so that the thruster operates. Moreover, because the power is directly supplied by the drone, the power system in the power device is reduced, the possibility of the power system touching water is reduced and the service life is increased.

Preferably, the power device further comprises a main engine, the main engine is located inside the buoyancy unit, the main engine and the thruster are connected through a power line, and the main engine is capable of generating electricity to drive the thruster to move. The main engine is installed in the power device, so that the power system is self-powered, providing powerful electricity, and strengthening the operating power of the power device.

Preferably, the buoyancy unit is a pontoon.

Preferably, the amphibious drone is equipped with one of the take-off and landing devices, the take-off and landing device is provided on the lower surface of the fuselage, and the take-off and landing device is located directly below the central axis of the amphibious drone. The amphibious drone is equipped with a take-off and landing device to achieve the effect of light structure and quick disassembly and assembly.

Preferably, the amphibious drone comprises at least two of the take-off and landing devices, and all the take-off and landing devices are symmetrically arranged along the central axis of the amphibious drone. The installation of two or more take-off and landing devices can not only ensure that the drone has a better water surface support effect, but also the increase of the take-off and landing devices strengthens the starting power, and the drone takes off and lands faster.

Preferably, the take-off and landing device is symmetrically provided directly below the linear support along the central axis of the drone.

On the basis of conforming to common knowledge in the field, the above preferred conditions can be combined arbitrarily to obtain preferred examples of the present invention.

The positive progress effect of the present invention is that the amphibious drone provided by the present invention installs the take-off and landing device on the lower surface of the drone, and realizes the water support of the drone by symmetrically providing the take-off and landing device. At the same time, the take-off and landing device is further provided with a power device for pushing the drone to be started. The amphibious drone can take off and land by relying on the take-off and landing device. In addition, the take-off and landing device can be disassembled to adapt to different usage conditions, and it is convenient to use and is strong in practicability.

DESCRIPTION OF REFERENCE NUMBERS

Figure 1:
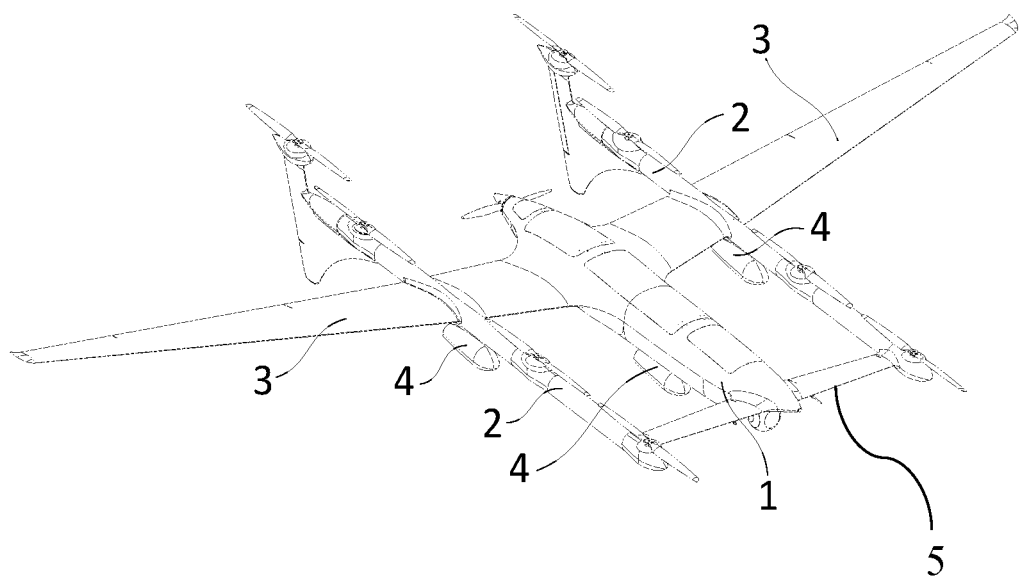
FIG. 1 is a schematic diagram of the structure of an amphibious drone according to the present invention.

Fuselage 1
Linear support 22
Main wing 3, forewing 7
Take-off and landing device 4
Buoyancy unit 41
Thruster 42
Power connector 43
Bump 44, power device 45, main engine 46, power line 47
receiving groove. 5

DESCRIPTION OF THE EMBODIMENTS

The present invention will be more clearly and completely described by means of two preferred embodiments in conjunction with the accompanying drawings hereinafter, but the present invention is not limited to the scope of the embodiments.

Embodiment 1

As shown in FIG. 1, the present invention provides an amphibious drone, comprising a fuselage 1, a linear support 2 and a main wing 3. The amphibious drone is equipped with a take-off and landing device 4, which is provided on the lower surface of one or more of the fuselage 1, the linear support 2 and the main wing 3. The take-off and landing device 4 comprises a buoyancy unit 41 and a power device, and the power device is capable of generating thrust to push the buoyancy unit 41 to move. The installation of the take-off and landing device 4 can realize that the buoyancy unit 41 serves as a buoyancy device to support the drone when the amphibious drone is floating on the water. The take-off and landing device 4 can also be used as a support device when the drone is landing on land. Since the take-off and landing device 4 has its own power device, the power device can directly drive the drone to move and take off and land by driving the buoyancy unit 41 to move.

Figure 2:
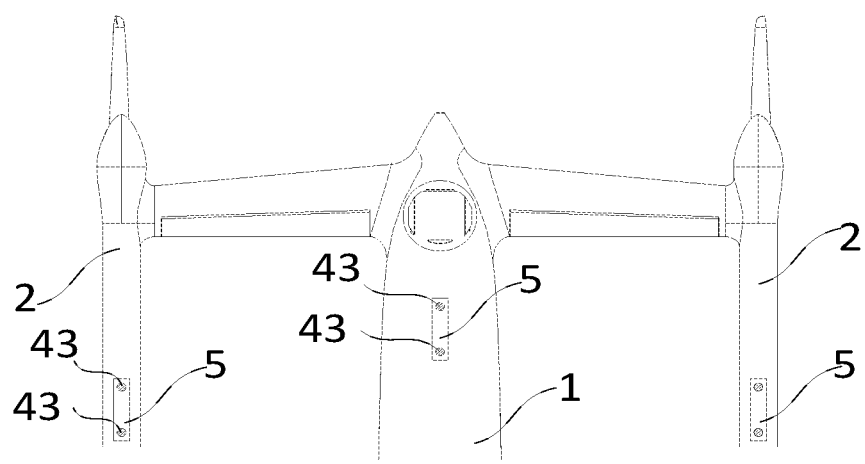
FIG. 2 is a bottom diagram of an amphibious drone according to the present invention.
Figure 3:
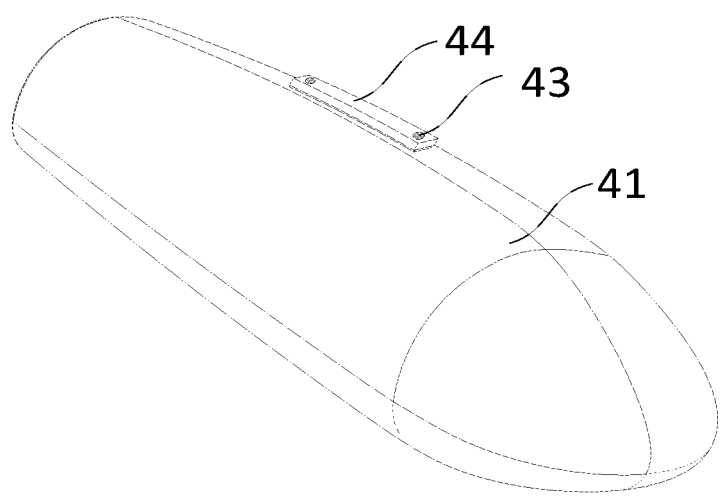
FIG. 3 is a schematic structural diagram of a take-off and landing device of an amphibious drone according to the present invention.
Figure 4:
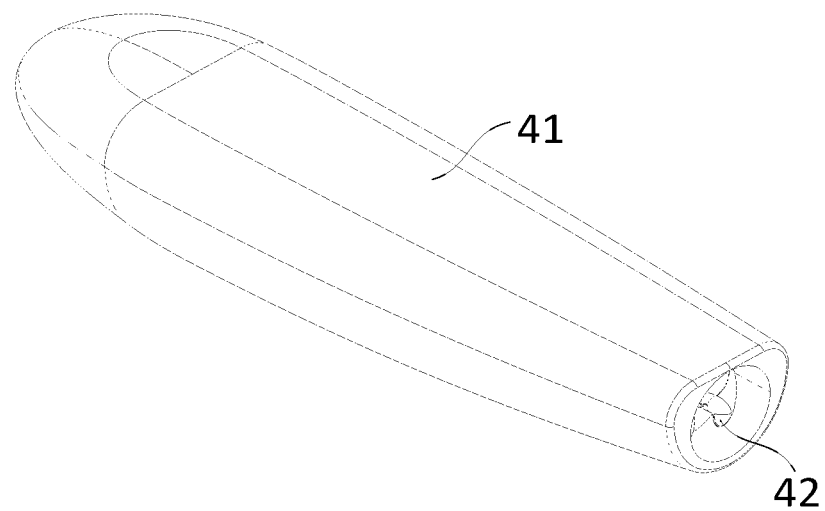
FIG. 4 is a schematic structural diagram of a take-off and landing device of an amphibious drone according to the present invention.

As shown in FIGS. 2 to 4, further, the take-off and landing device 4 is detachably connected to the fuselage 1 and/or the linear support 2 and/or the main wing 3. The detachable connection allows the drone to detach the take-off and landing device 4 when it does not need to land on water, reducing the weight of the drone to achieve a lighter flight effect. The take-off and landing device is reinstalled before the flight that requires landing on water, and is convenient and practical. In this embodiment, a bump 44 is provided on the take-off and landing device 4, the lower surface of the fuselage 1 and/or the linear support 2 and/or the main wing 3 is provided with a receiving groove 5, and when the take-off and landing device 4 and the fuselage 1 and/or the linear support 2 and/or the main wing 3 are in a connected state, the bump 44 is provided in the receiving groove 5. The bump 44 and the receiving groove 5 are provided to be connected quickly and sufficiently, and can realize the quick disassembly and assembly between the take-off and landing device 4 and the drone body. In other embodiments, other connection methods can also be used, such as lock connection.

The buoyancy unit 41 is an open hollow structure, and at least a part of the power device is located in the intermediate space of the buoyancy unit 41. A part of the power device is installed in the intermediate space of the buoyancy unit 41 to realize that when the power device is started, an air or water flow is formed in the open hollow space of the buoyancy unit 41. The thrust generated by the air or water flow pushes the power device to move forward and then drives the amphibious drone to move forward.

The power device comprises a thruster 42 and a power connector 43, and the thruster 42 is provided in the intermediate space of the buoyancy unit 41. Preferably, the thruster 42 uses a propeller system. The power connector 43 is located at the connection position between the take-off and landing device 4 and the amphibious drone, that is, on the surface of the bump 44. The thruster 42 and the power connector 43 are connected by a power line. A power connector 43 is further provided at the connection position between the fuselage 1 and/or the linear support 2 and/or the main wing 3 and the take-off and landing device 4, that is, on the surface of the receiving groove 5. The power device and the fuselage 1 and/or the linear support 2 and/or the main wing 3 are electrically connected through the connection state of the power connector 43, that is, when they are in the connected state, the bump 44 is located in the receiving groove 5. At the same time, the two power connectors 43 at corresponding positions are in contact with each other, so as to realize the power connection. The power connector 43 is provided to supply power to the thruster 42 through the drone so that the thruster 42 operates. Moreover, because the power is directly supplied by the drone, the power system in the power device is reduced, the possibility of the power system touching water is reduced and the service life is increased.

Further, in this embodiment, the buoyancy unit 41 is a float.

Further, the amphibious drone comprises at least two of the take-off and landing devices 4, and all the take-off and landing devices 4 are symmetrically arranged along the central axis of the amphibious drone. The installation of two or more take-off and landing devices 4 can not only ensure that the drone has a better water surface support effect, but also the increase of the take-off and landing devices 4 strengthens the starting power, and the drone takes off and lands faster. The take-off and landing device 4 can be provided on the lower surface of the fuselage 1, and can be provided directly below the linear support 2 along the central axis of the drone. In this embodiment, while a take-off and landing device 4 is provided on the lower surface of the fuselage 1, two take-off and landing devices 4 are further provided symmetrically below the linear support 2. In other embodiments, a take-off and landing device 4 can also be provided on the lower surface of the wing 3. At the same time, the amphibious drone can also be provided with only one take-off and landing device 4 so that it is located directly below the central axis of the drone to achieve the effect of light structure and quick disassembly and assembly.

Embodiment 2

Figure 5:
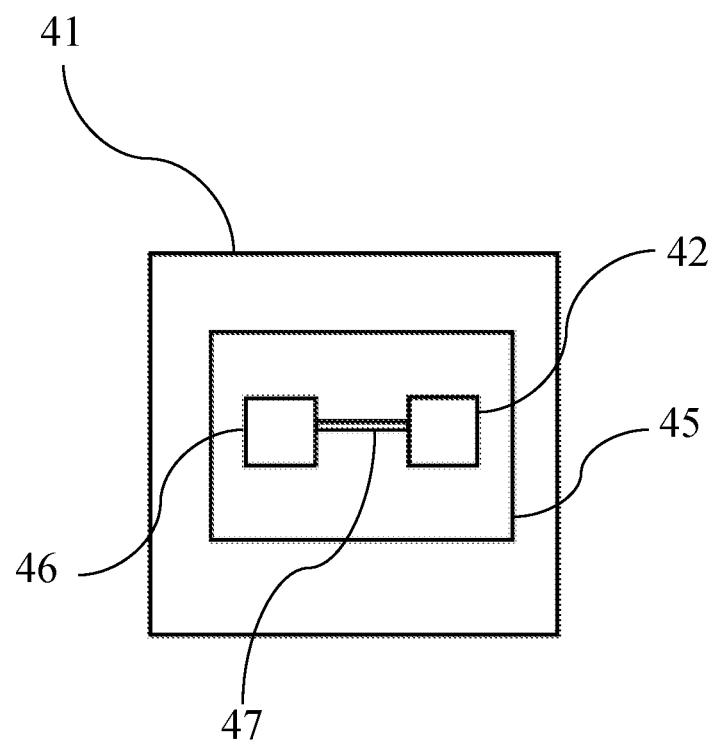
FIG. 5 is a graphic illustration of the relationship between a buoyancy unit, a power device, a main engine and a thruster, according to one embodiment of the present disclosure.

The structure of this embodiment is basically the same as that of Embodiment 1. The difference is that the amphibious drone of the present invention does not comprise the power connector 43. As shown in FIG. 5, the power device 45 comprises the thruster 42 and the main engine 46, the main engine 46 is located inside the buoyancy unit 41, the main engine 46 and the thruster 42 are connected through a power line 47, and the main engine is capable of generating electricity to drive the thruster 42 to move. The main engine 46 is installed in the power device 45, so that the power system is self-powered, providing powerful electricity, and strengthening the operating power of the power device.

Although the specific embodiments of the present invention have been described above, those skilled in the art should understand that this is only an example, and the protection scope of the present invention is defined by the appended claims. Those skilled in the art can make various changes or modifications to these implementations without departing from the principle and essence of the present invention, but these changes and modifications all fall within the protection scope of the present invention.

What is claimed is:
1. An amphibious drone comprising:
a fuselage;
a first linear support and a second linear support, where the second linear support is disposed parallel to the first linear support;
a main wing coupled to the fuselage and is directly attached to the first linear support;
a forewing directly attached to the first linear support;
a take-off and landing module directly connected to a lower surface of the first linear support; and
a propeller disposed at a rear end of the take-off and landing module;
wherein the take-off and landing module comprises a buoyancy unit and a power module;
wherein the propeller is capable of generating thrust to push the buoyancy unit to move in water.
2. The amphibious drone according to claim 1, wherein the take-off and landing module is detachably connected to the first linear support.
3. The amphibious drone according to claim 2, wherein a bump is provided on said take-off and landing module; and the lower surface of the first linear support is provided with a receiving groove to receive the bump.
4. The amphibious drone according to claim 1, wherein the power module further comprises a main engine, and the main engine generates electricity to drive the propeller.

\* \* \* \* \*